United States Patent [19]

Kozyra et al.

[11] Patent Number: 4,722,540
[45] Date of Patent: Feb. 2, 1988

[54] STEERING KNUCKLE ASSEMBLY

[75] Inventors: William L. Kozyra, Rochester Hills; Andrew B. MacIsaac, Livonia, both of Mich.

[73] Assignee: The Budd Company, Troy, Mich.

[21] Appl. No.: 910,935

[22] Filed: Sep. 24, 1986

Related U.S. Application Data

[63] Continuation-in-part of Ser. No. 670,983, Nov. 13, 1984, Pat. No. 4,618,159.

[51] Int. Cl.$^4$ .............................................. B62D 7/18
[52] U.S. Cl. ..................................... 280/93; 180/253; 280/96.1
[58] Field of Search ............... 280/93, 96.1, 661, 673, 280/674

[56] References Cited

U.S. PATENT DOCUMENTS

| | | | |
|---|---|---|---|
| 2,435,814 | 2/1948 | Allison | 280/96.1 |
| 2,771,301 | 11/1956 | Booth et al. | 280/673 |
| 3,758,129 | 9/1973 | Ishikawa et al. | 280/96.1 |
| 3,865,394 | 2/1975 | Epner et al. | 280/96.1 |
| 3,940,159 | 2/1976 | Pringle | 280/96.1 |
| 4,271,922 | 6/1981 | Kishline | 180/254 |
| 4,282,949 | 8/1981 | Kopich et al. | 180/252 |
| 4,377,298 | 3/1983 | Finn et al. | 280/663 |

FOREIGN PATENT DOCUMENTS

| | | | |
|---|---|---|---|
| 713933 | 10/1941 | Fed. Rep. of Germany | 280/661 |
| 829419 | 6/1938 | France . | |

*Primary Examiner*—John J. Love
*Assistant Examiner*—Kenneth R. Rice
*Attorney, Agent, or Firm*—Harness, Dickey & Pierce

[57] ABSTRACT

An improved steering knuckle assembly of the type including a stamped knuckle housing portion. In accordance with this invention, the conventional means for attaching suspension components to the knuckle which includes a tapered stud and correspondingly tapered bore within the knuckle are eliminated. Instead, the knuckle housing features a bore which is surrounded by a hemispherical seat region. The protruding stud of the ball joint or steering link extends through the bore and includes features which conform to the shape of both sides of the hemispherical seat to clampingly engage the suspension component to the steering knuckle housing. Another feature according to this invention is a steering knuckle configuration which eliminates the conventional protruding arm necessary for attachment to a steering link. A modified steering link is provided having a protruding stud which attaches directly to the concave-shaped steering knuckle housing.

10 Claims, 5 Drawing Figures

STEERING KNUCKLE ASSEMBLY

CROSS REFERENCE TO RELATED APPLICATIONS

This application is a continuation-in-part of copending application Ser. No. 670,983 filed Nov. 13, 1984 entitled "Steering Knuckle Assembly", now U.S. Pat. No. 4,618,159.

BACKGROUND AND SUMMARY OF THE INVENTION

This invention relates to motor vehicle suspension components and particularly to a steering knuckle assembly adapted to support a steerable wheel.

Conventional motor vehicles have a steering knuckle which is typically constructed as a one-piece forged or cast unit. Such integral units may include a wheel bearing carrier, torque arms for supporting a disc type brake caliper, and points of attachment for suspension components. Although such steering knuckles perform satisfactorily, it is desirable to provide enhanced structural and cost optimization for these units. It is particularly desirable to reduce the weight of the steering knuckle assembly since weight reductions in this area provide the two-fold advantage of reducing total vehicle weight and suspension unsprung mass. Overall vehicle weight reductions improve performance and fuel efficiency. Reductions in unsprung mass are desired to enhance vehicle ride and handling. It is further desirable to provide an improved steering knuckle assembly which can be produced at a lower cost than current designs. Another desirable feature for a steering knuckle assembly is the ability to adapt it to different motor vehicle applications.

The objective of the present invention is to provide the above-mentioned desirable features for a vehicle steering knuckle. A preferred embodiment of a steering knuckle assembly according to this invention is formed from two mechanically attached components. A bearing carrier component may be fabricated by conventional casting or forging processes and includes the wheel bearing carrier and torque arms for supporting a disc brake caliper assembly. The remaining portion of the steering knuckle assembly is formed by a concave shell-shaped housing preferably manufactured using metal stamping processes. This composite structure provides a significant weight advantage and cost advantage as compared with conventional designs primarily due to the use of stamped components. The steering knuckle assembly according to this invention may be adapted to different motor vehicle applications by changing the configuration of the stamped housing, enabling the same cast or forged bearing carrier component to be used for various applictions. When assembled, the steering knuckle assembly according to a preferred embodiment of this invention mechanically traps the wheel bearing within the steering knuckle assembly.

The steering knuckle assembly according to this invention further enables the stamped knuckle housing component to have a simplified configuration which eliminates the protruding steering arm of conventional steering knuckle designs. Instead, a novel steering link is employed which is fastened directly to a side wall portion of the knuckle housing.

In accordance with another feature of the steering knuckle assembly according to this invention, a novel means for fixing the ball joints of the vehicle suspension system to the steering knuckle is disclosed. The attachment system according to this invention eliminates the necessity of providing bushings having internally tapered bores as attachment sockets. The attachment system employs a hemispherically shaped seat formed by the knuckle housing which mates with complementary shaped surfaces of the ball joint attaching stud.

Additional benefits and advantages of the present invention will become apparent to those skilled in the art to which this invention relates from the subsequent description of the preferred embodiments and the appended claims, taken in conjunction with the accompanying drawings.

BRIEF DECRIPTION OF THE DRAWINGS

DETAILED DESCRIPTION OF THE INVENTION

Figure 1:
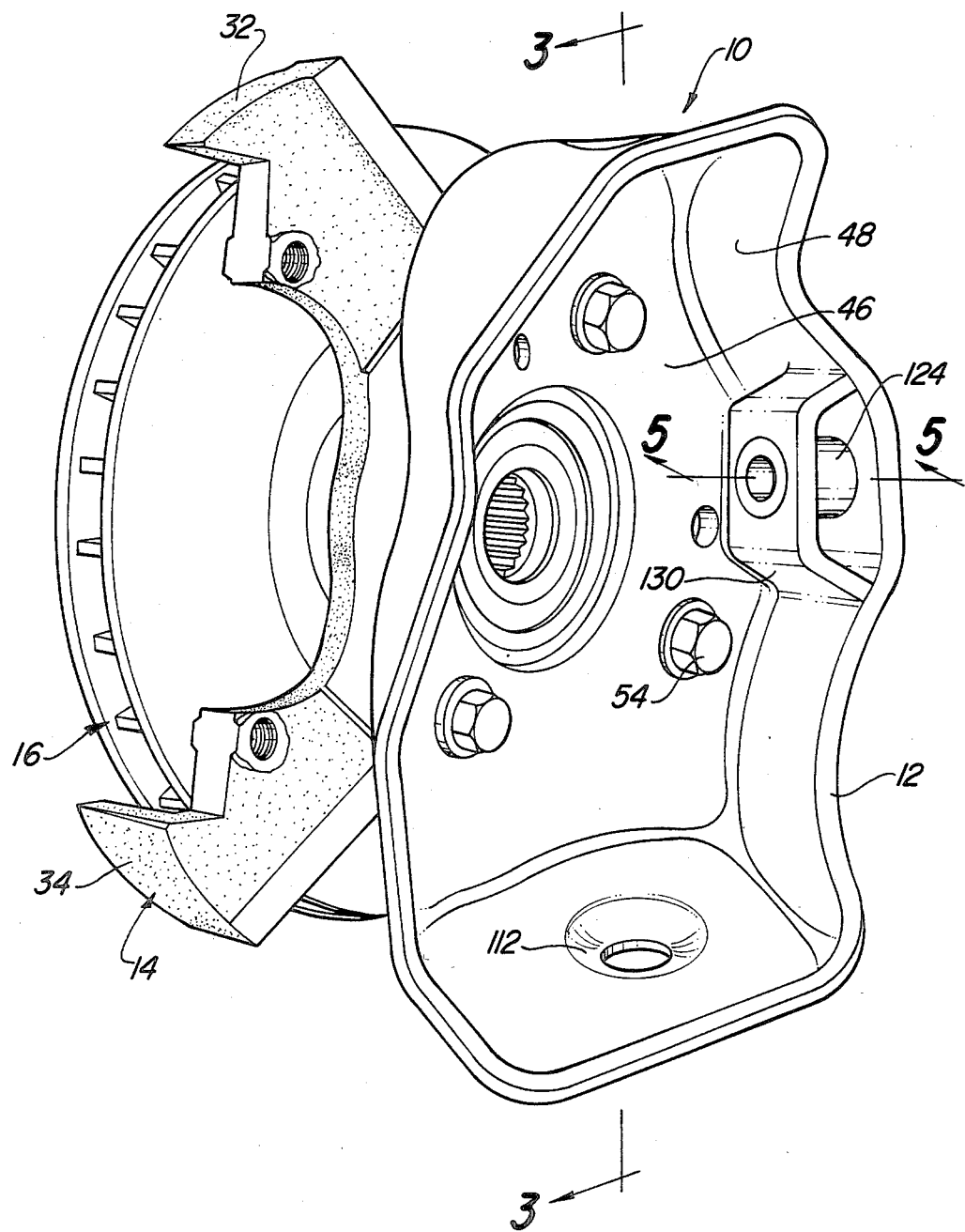
FIG. 1 is a perspective view of a steering knuckle assembly in accordance with this invention shown from an inboard viewing position and shown with associated components including a cartridge-type wheel bearing, a disc brake rotor, and a drive hub.

A steering knuckle assembly in accordance with this invention is shown in the drawings and is generally designated by reference character 10. The primary components of steering knuckle assembly 10 are knuckle housing 12 and bearing carrier 14. Steering knuckle assembly 10 is designed to support disc brake rotor 16 and hub 20 for rotation and provide a mount for disc brake caliper assembly 18, which is comprised of caliper 22 and shoes 24. Steering knuckle assembly 10 further provides mounting points for various suspension components, such as ball joints 38 and 40, and steering link 42. Alternately, knuckle assembly 10 could be configured to accept other types of suspension components such as strut type suspension units, etc. Steering knuckle assembly 10 described and illustrated herein is intended for use with a driven axle. The novel features of this invention, however, are also applicable to non-driven wheel configurations.

Bearing carrier 14 is preferably made by a casting or forging process and incudes an axially elongated internal bore 26 which is dimensioned to accept cartridge wheel bearing assembly 28. Preferably, the diameter dimensions are chosen to provide slight interference between bore 26 and wheel bearing assembly 28, thereby providing "press fit" installation of the bearing which is desirable to avoid rattling and provides accurate bearing alignment. Bore 26 terminates at its outboard end in a radially inward ridge which forms shoulder 30. The diameter of shoulder 30 is significantly less than the outer diameter of bearing assembly 28, so that the shoulder acts as an abutment to axially retain the wheel bearing from being withdrawn from bearing carrier 14. Bearing carrier 14 further includes an integrally formed pair of radially extending and angularly offset torque arms 32 and 34 which support disc brake caliper 22 and disc brake shoes 24. Torque arms 32 and 34 provide reaction points enabling caliper assembly 18 to exert a frictional retarding force on disc brake rotor 16. Bearing carrier 14 further forms a radially extending flange 36 having a number of threaded bores 44 therethrough which are radially spaced to encircle bore 26.

Steering knuckle housing 12 is preferably formed from sheet metal stock. Housing 12 could be formed by a progressive die metal stamping process wherein parts are moved from one work station to the next as they are formed from metal blanks to finished parts. Since housing 12 requires a considerable degree of deformation of the metal, mild steel is a preferred material. Housing 12 is formed in the shape of a concave shell and includes a generally flat center surface 46, and a peripheral edge flange portion 48 extending generally transverse from the center surface. Within center surface 46 is central aperture 50 which preferably has a diameter or a cross-sectional dimension smaller than the outer diameter of cartridge wheel bearing assembly 28. This configuration provides another abutment for mechanically trapping cartridge wheel bearing assembly 28 within bearing carrier 14. Radially spaced around aperture 50 are a number of fastener bores 52 which are positioned in registry with threaded bores 44. Threaded fasteners 54 pass through fastener bores 52 and threadingly engage threaded bores 44 to clamp steering knuckle housing 12 against bearing carrier 14.

It is necessary during assembly of knuckle housing 12 to bearing carrier 14 to insure the desired relative angular relationship between these components. Therefore, it is desirable to provide means for preventing assembly unless the components are properly oriented. This feature is accomplished for the embodiment shown in the drawings by unevenly radially spacing bores 44 and 52, so that they are aligned only when the desired relationship exists. Other possible approaches include keying the parts together such that the parts interengage only in the desired assembled part position.

In accordance with this invention, novel means are provided for affixing suspension components to knuckle housing 12. In accordance with prior art techniques for affixing ball joints to the steering knuckle, tapered bores are provided within the knuckle housing or bushings having tapered bores therein are attached to the housing. A protruding stud from the ball joint and steering link has a correspondingly shaped tapered shaft portion. The ball joint stud has a threaded end which allows a threaded fastener to attach the knuckle to the ball joint. In accordance with this invention, however, such tapered bore and shaft components are eliminated. Instead, ball joints 38 and 40 each feature extending threaded stud portions 102. At the point of attachment of ball joints 38 and 40 to knuckle housing 12, bores 106 and 108 are formed through the knuckle housing peripheral edge flange portion 48. In the area of housing 12 surrounding bores 106 and 108, the housing forms hemispherical seats 110 and 112 which define a concave surface on one side of the knuckle housing and a convex surface on the opposite surface. Ball joints 38 and 40 each include washer 114 which is fixedly mounted to stud portion 102 and forms a convex hemispherical surface which conforms with hemispherical seats 110 and 112. Washer 116 is provided and is adapted to be loaded onto stud portion 102 and defines hemispherical surfaces complementary with that of seats 110 and 112. Fastening nut 118 additionally includes a seat surface 120 having a concave surface which conforms to the convex surface of washer 116. Once fastening nut 118 is securely fastened, knuckle housing 12 is firmly clamped between washers 114 and 116 which are fastened to ball joints 38 and 40. The provision of the hemispherical seats permits mounting studs 102 and 104 to establish the desired relative orientation with respect to the steering knuckle 12 and remain in that position after fastening of nut 118. In addition, the provision of the various reinforcing members including washers 114 and 116 reinforces the area of knuckle housing 12 in the region of attachment of ball joints 38 and 40.

Figures 4, 5:
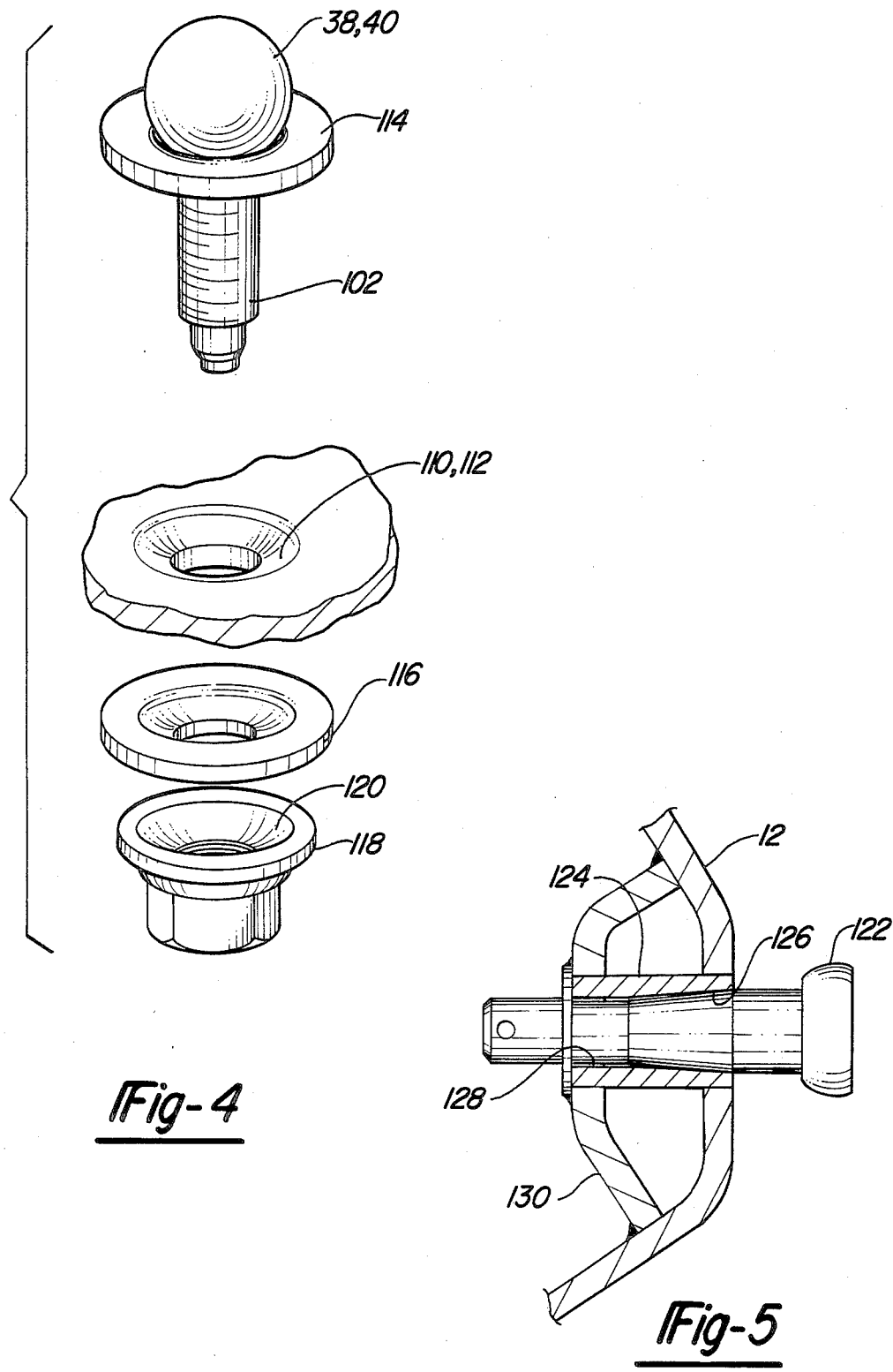
FIG. 4 is an exploded pictorial view of the hemispherical suspension attachment system according to this invention.
FIG. 5 is a cross-sectional view taken along line 5—5 of FIG. 1.

In accordance with another principal feature of this invention, a modified system for attaching steering link 42 to knuckle housing 12 is provided. Conventionally, a steering knuckle defines an extending arm to which the steering link is attached. The conventional steering link has a protruding threaded stud having a tapered surface which extends either upwardly or downwardly in a vertical direction into a bore in the steering link arm having a tapered inside surface. In accordance with this invention, the steering link stud 122 projecting from a pivotal coupling on the steering link is inserted directly into peripheral edge flange portion 48 of knuckle housing 12 through bore 126. Various attaching means may be employed for affixing steering link 42 to knuckle housing 12, including the previously mentioned hemispherical seat arrangement. As shown in FIG. 5, tapered bushing 124 is positioned between bores 126 and 128 in housing 12 and reinforcement plate 130, respectively.

Wheel bearing assembly 28, which is supported by steering knuckle assembly 10, is a cartridge-type bearing assembly. These types of bearing assemblies are integral units which have permanently assembled inner and outer races. Wheel bearing assembly 28 is sealed from the environment by inner and outer bearing seals 68 and 70. Preferably, seals 68 and 70 are identical, thereby enabling reversible installation of bearing 28. An additional seal 96 is preferably provided which is press fit into knuckle housing aperture 50. Seal 96 includes sealing lips which make sliding contact with drive shaft 72 thereby further acting to prevent contamination of wheel bearing assembly 28. Seals 68 and 70 preferably sealingly contact seal 96 and hub 20 respectively. Drive shaft 72 typically would include one or two constant velocity type universal joints 74. Universal joints 74 permit a degree of relative angular misalignment between portions of drive shaft 72, enabling suspension travel without damaging the drive shaft. Drive shaft 72 further includes an extending splined shaft 78 having a threaded end 80. Hub 20 forms an internal splined surface which corresponds and mates with the splines of shaft 78 and has a radially extending flange 82 which provides a mounting location for a plurality of wheel mounting studs 84. Hub 20 has a cylindrical surface or nose 86 which preferably frictionally engages the inner race of cartridge wheel bearing assembly 28 when these parts are assembled.

Disc brake rotor 16 may be a conventional integral unit or a composite type having a stamped sheet metal center 88 with an outer cast rotor surface 90. The composite configuration of rotor 16 provides a more mass efficient unit. Center 88 includes a plurality of radially spaced bores 92 which receive wheel mounting studs 84.

Figure 2:
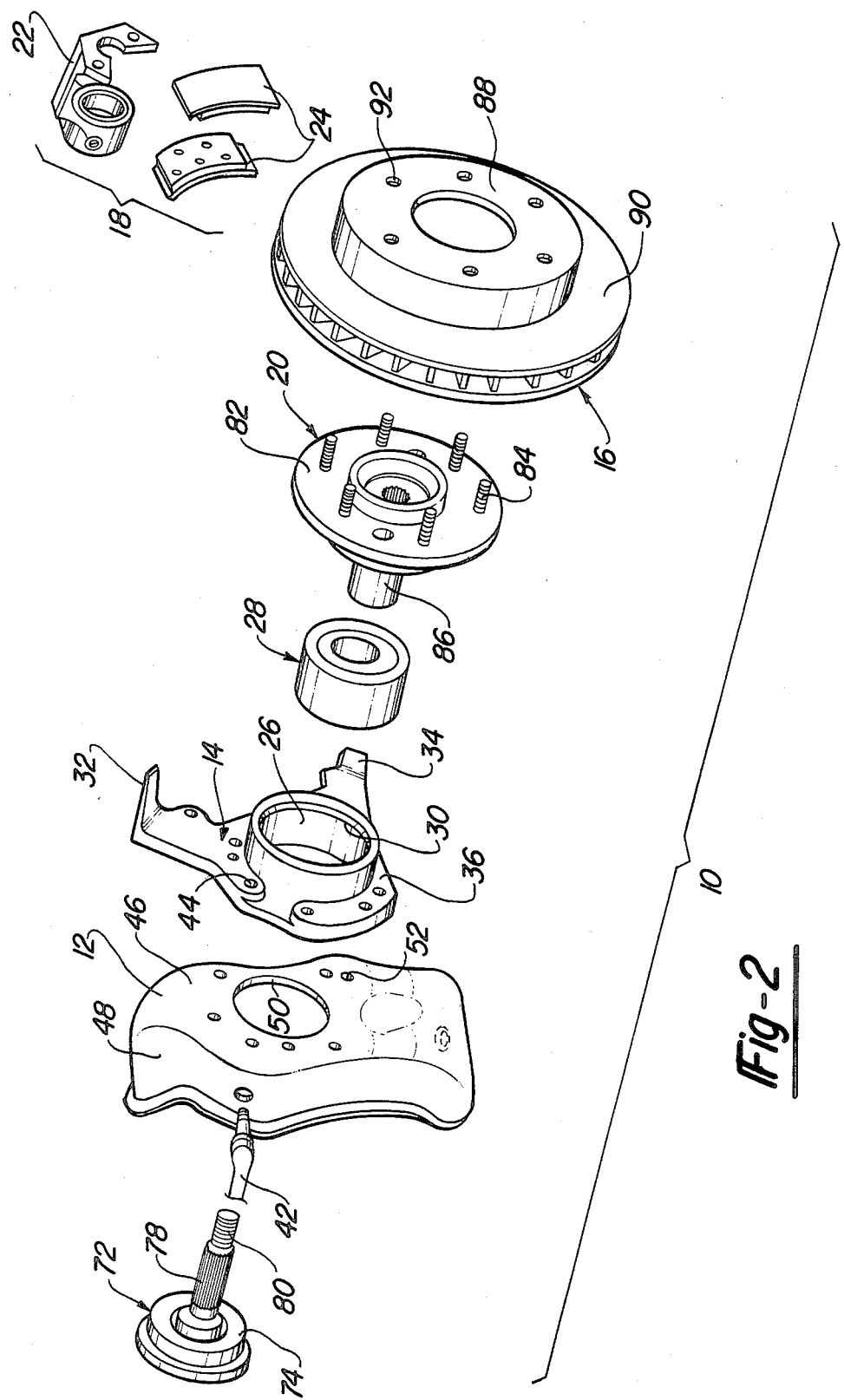
FIG. 2 is an exploded perspective view of the steering knuckle assembly according to this invention showing the components thereof in unassembled positions and further showing associated components including a hub, a disc brake rotor, a brake caliper, and a steering link.
Figure 3:
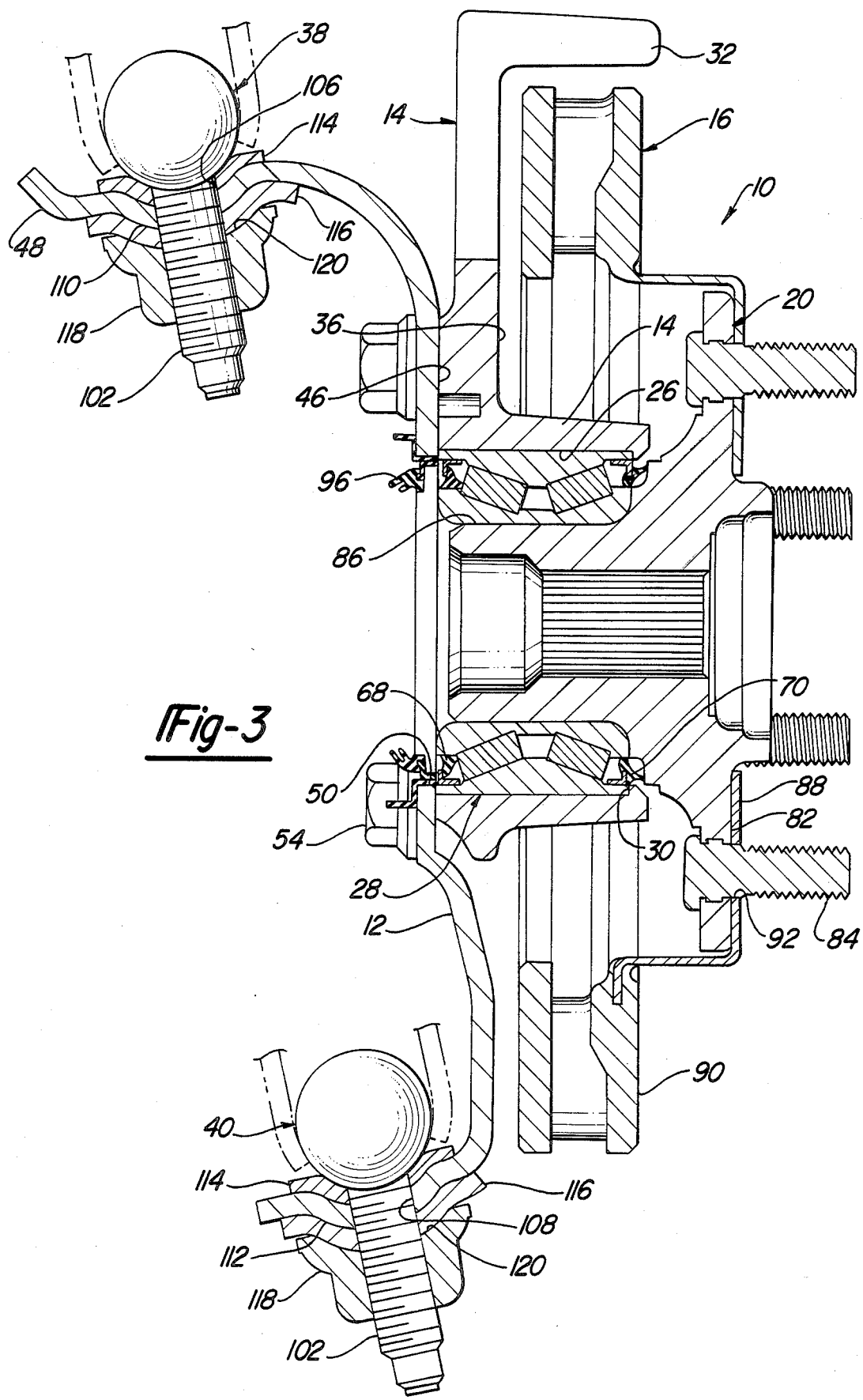
FIG. 3 is a cross-sectional view taken along line 3—3 of FIG. 1 showing the various components of the steering knuckle assembly with associated suspension component.

The assembly and operation of steering knuckle assembly 10 will now be described in detail. The assembly of the various components is best explained with particular reference to the exploded pictorial view of FIG. 2. During initial assembly, cartridge bearing assembly 28 is press fit within bore 26 of bearing carrier 14. Due to the presence of shoulder 30, it is necessary to load and press cartridge wheel bearing assembly 28 from the inboard side of bearing carrier 14. Bearing assembly 28 is depressed within bore 26 until it engages shoulder 30 which prevents further displacement.

Steering knuckle housing 12 is loaded into position such that fastening bores 52 are aligned with threaded bores 44. Thereafter, threaded fasteners 54 are installed, thereby fixing these two components. Since central aperture 50 has a radial dimension smaller than the diameter of the outer race of cartridge wheel bearing 28, the bearing becomes trapped between abutments formed by steering knuckle housing 12 and shoulder 30 of bearing carrier 14. Bearing 28 is therefore retained within steering knuckle assembly 10 both by press fit and mechanical trapping engagement. This fastening approach provides more secure engagement of wheel bearing assembly 28 than according to prior art designs wherein a press fit is the only mechanism used to secure the wheel bearing. Seal 96 is press fit into aperture 50 of housing 12. Hub 20 is preferably press fit into the inner race of cartridge bearing assembly 28. Drive shaft 72 is installed such that splined portion 78 passes through and engages within a correspondingly splined internal bore of hub 20. Finally, rotor 16, caliper 22 and brake shoes 24 are installed.

While the above description constitutes the preferred embodiments of the present invention, it will be appreciated that the invention is susceptible to modification, variation and change without departing from the proper scope and fair meaning of the accompanying claims.

What is claimed is:

1. An improved suspension component mounting system adapted for attaching a vehicle steering knuckle assembly to a ball joint or a steering link of the type having a protruding attachment stud coupled to a flexible coupling comprising:
    said steering knuckle assembly having a housing defining a peripheral edge flange portion,
    a bore defined within said peripheral edge flange portion,
    a seat surrounding said bore defining a concave housing surface on one surface of said edge flange portion and a convex housing surface on the opposite surface of said edge flange portion, and
    said attachment stud having:
        a threaded stud portion,
        a convex stud surface engageable with said concave housing surface,
        a concave stud surface engageable with said convex housing surface, and
        fastener means for clamping said concave stud surface and said convex stud surface against said concave housing surface and said convex housing surface, thereby rigidly fastening said attachment stud to said steering knuckle assembly.

2. The improved suspension component mounting system according to claim 1 wherein said concave and convex housing surfaces and said concave and convex stud surfaces are generally hemispherical in shape.

3. The improved suspension component mounting system according to claim 1 wherein said convex stud surface is defined by a first washer member rigidly affixed to said attachment stud.

4. The improved suspension component mounting system according to claim 1 wherein said concave stud surface is defined by a second washer member slidably disposed on said threaded stud.

5. A steering knuckle for a vehicle adapted to rotate about a generally vertical axis in response to steering inputs from a steering link having an attachment stud projecting from a pivotal coupling, said knuckle supporting a ground engaging wheel rotatable about a generally horizontal axis comprising:
    said steering knuckle having a peripheral flange having surfaces generally parallel to said horizontal axis, and
    coupling means for engaging said steering link defining an aperture within said peripheral flange having its longitudinal axis generally perpendicular to said generally vertical axis whereby said attachment stud is oriented along said aperture longitudinal axis and wherein said pivotal coupling is positioned adjacent said steering knuckle peripheral flange when said attachment stud is engaged by said coupling means.

6. The improved steering knuckle for a vehicle according to claim 5 wherein said steering knuckle is defined by a stamped metal shell having a generally planar central portion and edge portions defining said peripheral flange.

7. The improved steering knuckle for a vehicle according to claim 5 wherein said peripheral flange further defines mounting points for a pair of ball joint assemblies which define said generally vertical axis.

8. The improved steering knuckle for a vehicle according to claim 5 wherein said aperture is defined by a bushing affixed to said peripheral flange.

9. The improved steering knuckle for a vehicle according to claim 8 wherein said bushing defines an internally tapered bore.

10. A steering assembly for a vehicle adapted to rotate about a generally vertical axis in response to steering inputs from a steering link, said steering assembly supporting a ground engaging wheel comprising:
    a steering knuckle having a peripheral flange having surfaces generally parallel to said longitudinal axis and having coupling means defining an aperture having its longitudinal axis generally mutually perpendicular to a portion of said peripheral flange surface and said generally vertical axis,
    a steering link having an elongated bar portion and an attachment stud with a pivotal coupling therebetween, said attachment stud being received by said coupling means such that the longitudinal axis of said stud is generally perpendicular to a portion of said peripheral flange surface, and
    a pair of ball joints coupled to said steering knuckle enabling said knuckle to rotate about said generally vertical axis in response to steering inputs from said steering link.

* * * * *